(12) United States Patent
Steiner et al.

(10) Patent No.: US 9,815,150 B2
(45) Date of Patent: Nov. 14, 2017

(54) BRAZING PRE-FLUX COATING WITH IMPROVED CORROSION PERFORMANCE

(75) Inventors: Dagmar Steiner, Wedemark (DE); Jan Halvor Nordlien, Kolnes (NO); Jeffrey L. Insalaco, Rockledge, FL (US)

(73) Assignee: SAPA AS, Oslo (NO)

( * ) Notice: Subject to any disclaimer, the term of this patent is extended or adjusted under 35 U.S.C. 154(b) by 480 days.

(21) Appl. No.: 14/346,353

(22) PCT Filed: Sep. 6, 2012

(86) PCT No.: PCT/NO2012/000051
§ 371 (c)(1),
(2), (4) Date: Jul. 15, 2014

(87) PCT Pub. No.: WO2013/043054
PCT Pub. Date: Mar. 28, 2013

(65) Prior Publication Data
US 2014/0345750 A1    Nov. 27, 2014

(30) Foreign Application Priority Data

Sep. 22, 2011    (NO) .................................. 20111290

(51) Int. Cl.
| | | |
|---|---|---|
| *B23K 35/362* | (2006.01) | |
| *B23K 35/365* | (2006.01) | |
| *C22C 21/00* | (2006.01) | |
| *B23K 1/00* | (2006.01) | |
| *B23K 1/20* | (2006.01) | |
| *F28F 21/08* | (2006.01) | |
| *B23K 35/36* | (2006.01) | |

(52) U.S. Cl.
CPC .......... *B23K 35/365* (2013.01); *B23K 1/0012* (2013.01); *B23K 1/203* (2013.01); *B23K 35/362* (2013.01); *C22C 21/00* (2013.01); *F28F 21/084* (2013.01); *F28F 2275/04* (2013.01)

(58) Field of Classification Search
CPC .... B23K 35/362; B23K 35/365; B23K 1/203; B23K 1/0012; F28F 21/084; F28F 2275/04
See application file for complete search history.

(56) References Cited

U.S. PATENT DOCUMENTS

| 5,171,377 A | 12/1992 | Shimizu et al. |
| 2003/0203137 A1 | 10/2003 | Teshima et al. |
| 2004/0164125 A1* | 8/2004 | Morley ................... B21C 37/08 228/173.1 |
| 2011/0220617 A1 | 9/2011 | Becker et al. |

FOREIGN PATENT DOCUMENTS

| EP | 1 808 255 | 7/2007 | |
| EP | 2 159 528 | 3/2010 | |
| GB | 2 241 513 | 9/1991 | |
| JP | 3-226396 | 10/1991 | |
| JP | 2009-269043 | 11/2009 | |
| WO | 2007/042206 | 4/2007 | |
| WO | 2010/060869 | 6/2010 | |
| WO | WO 2010/060869 | * 6/2010 | ............... B23K 1/00 |

OTHER PUBLICATIONS

Office Action dated Aug. 13, 2015 in corresponding Chinese patent application No. 201280046363.8 (with English translation).
Office Action dated Apr. 26, 2015 in corresponding Japanese Patent Application No. 2014-531751 (English translation).
Office Action dated Apr. 19, 2016 in corresponding Chinese patent application No. 201280046363.8 (with English translation).
International Search Report dated Nov. 23, 2012 in International (PCT) Application No. PCT/NO2012/000051.
Supplementary European Search Report dated Apr. 1, 2016 in corresponding European patent application No. 12 83 3168.

* cited by examiner

*Primary Examiner* — Lois Zheng
(74) *Attorney, Agent, or Firm* — Wenderoth, Lind & Ponack, L.L.P.

(57) ABSTRACT

A pre-flux coating for the manufacturing of heat exchanger components of aluminum, wherein the coating comprises a combination of fluxes in the form of potassium aluminum fluoride $K_{1-3}AlF_{4-6}$, potassium trifluoro zincate, $KZnF_3$, lithium aluminum fluoride $Li_3AlF_6$, a filler material in the form of metallic Si particles, Al—Si particles and/or potassium fluoro silicate $K_2SiF_6$, an additive in the form of aluminum oxide and at least one other oxide selected from the group consisting of zinc oxide, titanium oxide and cerium oxide forming a post braze ceramic layer, and a solvent and a binder containing at least 10% by weight of a synthetic resin which is based, as its main constituent, on a methacrylate homopolymer or a methacrylate copolymer.

9 Claims, No Drawings

BRAZING PRE-FLUX COATING WITH IMPROVED CORROSION PERFORMANCE

The present invention is related to a pre-flux coating with improved corrosion performance for the manufacturing of components by brazing, in particular manufacturing of heat exchangers of aluminum components, the coating including one or more fluxes and filler material(s).

Heat exchangers can either be mechanically assembled or they can be brazed. It is state of the art to braze aluminum heat exchanger in a so-called CAB process which stands for Controlled Atmosphere Brazing. It is called Controlled Atmosphere as the brazing takes place under the protection of inert gas. Typically this gas is nitrogen.

The known pre-flux coatings are combination of a flux and filler material. Flux is required to clean the surfaces of the aluminum parts from oxides and the filler metal is required for the metallic bonding.

Due to the fact that oxygen is nearly excluded in the furnace atmosphere (key process parameter for controlling the process), less aggressive types of flux can be used. Older brazing technologies used fluxes that were corrosive in nature and required post braze cleaning processes to remove corrosive flux residues. If not removed, early corrosion could occur in the field. The less aggressive fluxes so called non-corrosive fluxes, are mainly comprised of aluminum fluorides such as potassium aluminum fluoride.

The required filler metal is usually a low melting aluminum alloy from AA4xxx series (containing silicon).

As stated above, aluminum heat exchangers are commonly used for automotive applications. Such heat exchangers are commonly used in air conditioning system, engine cooling system, engine oil cooling system and in automotive engine turbo-charger systems.

In addition to automotive applications, aluminum heat exchangers are now to an increasing extent being used for non-automotive applications such as industrial and residential applications performing similar functions as in automotive applications.

Brazing heat exchangers using the Controlled Atmosphere Brazing process relies to a large extent on:
The flux (typically potassium aluminum fluoride)
The filler (typically from AA4xxx series)
The properties of the protective atmosphere (typically nitrogen), and
The elevated temperature exposure required to melt the filler material for metallic bonding.

The process parameters are modified depending on the type/size of heat exchanger to be brazed as well as the types of filler metal and flux compounds used.

Common practice for creating a metallic bond in a heat exchanger is by having one of the two components being joined to be clad with AA4xxx series (for example, clad fin and non-clad tube). A general application of flux (as defined previously) is applied to the entire heat exchanger assembly prior to brazing.

New types of braze coating eliminates the requirement of having one of the components made from clad material (AlSi material). These types of coating type are called Silflux™ (made by the company Solvay) and HYBRAZ® (introduced by the applicant).

For corrosion protection of brazed aluminum components, a protective layer can be used. The protective layer can in general be of the following two types:
Passive
Sacrificial A sacrificial layer is a layer which is less noble than the core material. It will result in lateral corrosion when exposed to aggressive environment. A typical sacrificial layer on aluminum is the application of a zinc layer. This zinc layer can be applied to the aluminum surface by zinc arc spraying. Metallic zinc is applied to the product such as a multi-port extrusion (MPE) surface typically in line during the extrusion process. Full corrosion protection occurs after the tube has passed through a brazing cycle and a zinc diffusion gradient is formed into the tube.

As an alternative to the zinc arc spray application of zinc to an aluminum component surface as mentioned above, there is now a significant interest in using reactive Zn flux on the aluminum surface. The HYBRAZ® coated products containing reactive Zn flux provides flux for brazing as well as a Zn diffusion gradient into the tube for corrosion protection. Zn flux is a so called reactive flux from potassium fluorozincate type, generating brazing flux and metallic zinc during the brazing cycle. The metallic zinc forms a Zn gradient into the Al tube as a sacrificial layer.

On the other hand, a passive layer is a coating that is chemically passive (dead) and covers the surface.

From WO 2011/011251 is formerly known a method for treating an aluminum article where flux is applied to an outer surface of the aluminum article to improve their resistance and reduce corrosion. The outer surface of the article is initially brazed and then anodized to form an oxide layer where a portion of the oxide layer is formed between the flux and the outer surface of the aluminum article.

In the applicants former Norwegian patent application No. 20101172 the inventors further improved the applicant's HYBRAZ® coated products by introducing an Li-containing flux into the flux coatings for Al tubes used in heat exchangers since this flux after brazing provides flux residues on the surface of the product that show limited water solubility and therefore reduced attack from dissolved fluorides to the aluminum surface.

The situation relating to industrial applications (HVAC&R) is different. Heat exchangers are different in size (much larger), have a longer life time and have to withstand different conditions. An example is their exposure to high pH or low pH conditions.

It is also known that a residual flux layer improves the corrosion resistance compared to bare Al parts. This is due to low water solubility of the flux residues. A very low dissolution of flux residues takes place under the conditions in automotive applications. The exposure to water in non-automotive applications is different. The aluminum parts are exposed to varying conditions (dry, humid, low pH/high pH).

The present invention is based on the principle of providing a ceramic layer which is created during the brazing cycle and which is beneficial for a better corrosion resistance against impact from stationary water.

Thus, with the present invention major advantages are obtained in particular in relation to non-automotive applications such as:
Investment saving
Increased productivity
Less energy usage
Improved quality
Weight reduction The invention is characterized by the features as defined in the independent claim, and preferred embodiments are further defined in the—dependent claims.

The invention will now be further described in the following by way of examples. The major focus within the applicant's work on combining a braze material with additives was, as mentioned above, on non-automotive applications.

In particular, applications relating to where varying conditions might cause influence to the heat exchanger, additional corrosion protection, beyond sacrificial Zn protection is desired. In the applicants former Norwegian patent application No. 20101172 the inventors further improved the applicant's HYBRAZ® coated products by introducing an Li-containing flux into the flux coatings for Al tubes used in heat exchangers since this flux after brazing provides flux residues on the surface of the product that show limited water solubility and therefore reduced attack from dissolved fluorides to the aluminum surface. This former invention thus provided a novel pre-flux coating which provides both sacrificial and passive protection and which, at the same time provides braze (filler) material for the joint formation and flux for removal of oxide layer.

With the present invention the inventors have come a step further in their attempt to improve corrosion resistance against impact from varying conditions in industrial applications. Thus, the inventors got the idea to create and strengthen a post-braze ceramic layer on the substrate (product) to be brazed which is able to withstand better the requirements in HVAC&R applications. The idea was not to stop at the stage of a layer from standard post-braze flux residues but maintain the stability of this ceramic layer with additives.

Different materials were added to HYBRAZ® coatings and the corrosion behaviour of brazed minicores were tested by SWAAT exposure.

Initially, aluminum oxide was used as additive and a clear improvement was seen which is further shown as discussed below.

In a second step other materials will be investigated. This work is ongoing and will be finished within 2011. Other materials are zinc oxide, titanium oxide, cerium oxide and common pigments used as corrosion protection pigments in lacquers/paints The HYBRAZ® pre-flux coating according to the present invention is based on a mixture including flux particles from one or more fluxes with different properties, as well as Si particles as filler material and suitable oxide or material forming a post braze ceramic layer and further including a solvent and binder. More precisely the present invention may be composed of fluxes such as potassium aluminum fluoride ($K_{1-3}AlF_{4-6}$), potassium trifluoro zincate ($KZnF_3$), lithium aluminum fluoride $Li_3AlF_6$, filler material in the form of metallic Si particles, Al—Si particles and/or potassium fluoro silicate $K_2SiF_6$, and aluminum oxide and/or other suitable oxide or material forming a post braze ceramic layer, the coating further including solvent and binder containing at least 10% by weight of a synthetic resin which is based, as its main constituent, on methacrylate homopolymer or methacrylate copolymer.

The potassium aluminum fluoride ($K_{1-3}Al_{F4-6}$) as mentioned above can be $KAlF_4$, $K_2AlF_5$ and $K_3AlF_6$ or a combination of these. This is a product from a real synthesis.

Potassium trifluoro zincate, $KZnF_3$ can be added for corrosion protection by forming a Zn diffusion gradient into the brazed product.

The potassium fluoro silicate $K_2SiF_6$ reacts with Al and generates Si metal, which forms AlSi12 as filler metal.

Further, lithium aluminum fluoride $Li_3AlF_6$ may as an option be added for limiting water solubility of flux residues and therefore limited attack from stationary water.

As to the particles added to form the post braze ceramic layer, beyond the aluminum oxide, other suitable oxides such as zinc oxide, titanium oxide, cerium oxide or combination of these may be added. Further, common pigments used as corrosion protection pigments in lacquers/paints may be added.

Correct composition is required to obtain the desired effect from post-braze flux residues. For alloys with high Mg, optionally potassium aluminum fluoride (see above) plus cesium aluminum fluoride $CsAlF_4$, mechanically blended, may be added.

As to the composition of the coating materials, the content of solvent may preferably be approximately 30 wt % depending on the desired application properties. Further the ratio of particles and binder may vary from 3:1 to 4:1.

Additional thickener might be added to the coating material (cellulose), content approx. 14 wt % related to acrylic binder.

The ratio of particles of the different fluxes may vary as is apparent from the table below.

The coating as applied on an aluminum component may further vary with different total load between 8 $g/m^2$ and 16 $g/m^2$. See as well in this connection the table below.

TABLE (particle content):

| | Silicon (Si) $g/m^2$ | Zn Flux ($KZnF_3$) $g/m^2$ | Flux ($KAlF_4/K_3AlF_6$) $g/m^2$ | Additive (oxide/pigment) $g/m^2$ |
|---|---|---|---|---|
| Ratio (coating) | 0-4.5 | 2-16 | 4-8 | 0.01-5 |
| Ratio (load) | 0-5.2 | 1.41-16 | 2.2-9.2 | 0.01-5 |

The coating is produced by mixing based on the following sequence:
 blending of solvent and binder by stirring in a suitable blender, and
 adding of the flux particles and oxide or other material particles forming the ceramic layer to the solvent and binder composition under continuous stirring,
 thorough mixing of the composition until desired quality with respect to specified parameters of the coating material is obtained.

Upon application of the coating on the components to be brazed, the coating is again subjected to stirring to guarantee a homogenous coating material. During the stirring operation viscosity of the coating is adjusted according to the application process and equipment.

Drying of coated components may take place in a separate drying process, e.g. using IR light or other heating sources.

It should be stressed that the invention as defined in the claims is not restricted to the example as described above. Thus, the coating may be blended and applied as a one layer coating or a multi layer coating.

One layer coating represents the preferred embodiment of the invention and implies that all flux components are mixed with binder and solvent and are applied in one step to the aluminum surface.

As a multi layer coating is understood that the coating is mixed as separate coatings with binder and solvent and can be applied in 2, 3 or 4 layers as follows:
 2 layer coating:
  In a first layer flux, potassium aluminum fluoride, and filler material or filler generating material are applied to the aluminum surface.
  In a second layer the additive is applied.
  The coating applied either in the first or in the second layer might contain other components such as potassium trifluoro zincate or lithium aluminum fluoride.
 The opposite direction of the two layers is possible too, with the additive/oxide as first layer.

3 layer coating:
  Each component is applied as a single coating layer.
  Flux coating layer
  Filler material or filler generating material coating layer.
  Potassium trifluoro zincate coating layer.
  The additive can be applied within each of the coating layers. Each layer might con lithium aluminum fluoride.
4 layer coating:
  Each component is applied as a separate coating layer as with the 3 layer above.

In the case of a multi layer coating it will be important to control the total amount of binder to avoid any trouble from too high content of organic resin and therefore trouble in brazing. In case of a multi layer coating some of the layers might be discontinuously applied.

As to how the pre-flux coating may be provided on an aluminum component, any technique may be used such as roll coating, dip coating, spray coating or even screen printing.

The invention claimed is:

1. A pre-flux coating for the manufacturing of heat exchanger components of aluminum, wherein the coating comprises a combination of fluxes in the form of potassium aluminum fluoride $K_{1-3}AlF_{4-6}$, potassium trifluoro zincate, $KZnF_3$, lithium aluminum fluoride $Li_3AlF_6$, filler material in the form of metallic Si particles, Al—Si particles and/or potassium fluoro silicate $K_2SiF_6$, an additive in the form of aluminum oxide and at least one other oxide selected from the group consisting of zinc oxide, titanium oxide and cerium oxide forming a post braze ceramic layer, and a solvent and a binder containing at least 10% by weight of a synthetic resin which is based, as its main constituent, on a methacrylate homopolymer or a methacrylate copolymer.

2. The pre-flux coating according to claim 1, wherein the coating is blended as (i) a one layer coating comprising the flux component, the filler material and the additive mixed with the binder and the solvent, or (ii) a multi-layer coating comprising the flux component, the additive and the filler material mixed as separate coatings with the binder and the solvent.

3. The pre-flux coating according to claim 2, wherein the multi-layer coating comprises 2, 3 or 4 individually blended coating layers, wherein each layer comprises the binder and the solvent with at least one of (i) the flux component, (ii) the additive, and (iii) the filler material or a filler generating material.

4. The pre-flux coating according to claim 1, wherein the potassium aluminum fluoride, $K_{1-3}AlF_{4-6}$, is at least one compound selected from the group consisting of $KAlF_4$, $K_2AlF_5$, and $K_3AlF_6$.

5. The pre-flux coating according to claim 1, wherein the aluminum component is based on an aluminum alloy with a high Mg content,
  and the coating further comprises an additional flux component of cesium aluminum fluoride $CsAlF_4$.

6. The pre-flux coating according to claim 1, wherein a ratio of the particles and the binder is between 3:1 to 4:1.

7. The pre-flux coating according to claim 1, wherein a ratio of particles of the different components of the coating corresponds to a load of 0-5.2 $g/m^2$ Si, 1.41-16 $g/m^2$ Zn flux ($KZnF_3$), 2.2-9.2 $g/m^2$ potassium flux ($KAlF_4/K_3AlF_6$) and 0.1-5 $g/m^2$ additive/oxide.

8. A method of applying the pre-flux coating according to claim 1 on an aluminum component as a one layer coating or a multi-layer coating,
  wherein the method comprises (i) applying in one operation a mixture of the flux component, the filler material, the binder and the solvent on the aluminum component to obtain the one layer coating, or (ii) applying a first layer comprising a mixture of the flux component, the filler material and a second layer comprising the binder and the solvent, and optionally applying an intermediate curing between the first and second layers, on the aluminum component to obtain the multi-layer coating.

9. The method according to claim 8, wherein the coating is applied on the aluminum component by roll coating or dip coating.

* * * * *